(12) United States Patent
Brendel

(10) Patent No.: US 8,978,616 B2
(45) Date of Patent: Mar. 17, 2015

(54) INTERNAL COMBUSTION ENGINE WITH MULTI-JOINT CRANK DRIVE AND ADDITIONAL MASSES ON ARTICULATED CONNECTING RODS OF THE MULTI-JOINT CRANK DRIVE FOR DAMPING FREE INERTIA FORCES

(75) Inventor: Matthias Brendel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 72 days.

(21) Appl. No.: 13/812,429

(22) PCT Filed: Jul. 13, 2011

(86) PCT No.: PCT/EP2011/003489
§ 371 (c)(1),
(2), (4) Date: Jan. 25, 2013

(87) PCT Pub. No.: WO2012/013298
PCT Pub. Date: Feb. 2, 2012

(65) Prior Publication Data
US 2013/0118442 A1 May 16, 2013

(30) Foreign Application Priority Data
Jul. 28, 2010 (DE) .......................... 10 2010 032 441

(51) Int. Cl.
*F16F 15/26* (2006.01)
*F02B 75/04* (2006.01)
*F02D 15/02* (2006.01)
*F16C 3/06* (2006.01)
*F16F 15/28* (2006.01)

(52) U.S. Cl.
CPC ................. *F16C 3/06* (2013.01); *F02B 75/048* (2013.01); *F02D 15/02* (2013.01); *F16F 15/262* (2013.01); *F16F 15/28* (2013.01); *F16F 15/283* (2013.01)
USPC .................... 123/197.4; 123/192.2; 123/48 B; 123/78 E

(58) Field of Classification Search
USPC ............ 123/197.4, 197.3, 192.1, 192.2, 78 E, 123/48 B
See application file for complete search history.

(56) References Cited

U.S. PATENT DOCUMENTS

| 4,517,931 A | 5/1985 | Nelson |
| 6,615,773 B2 * | 9/2003 | Moteki et al. ............... 123/48 B |

(Continued)

FOREIGN PATENT DOCUMENTS

| DE | 102005054760 | 5/2007 |
| DE | 102005054761 | 5/2007 |

(Continued)

*Primary Examiner* — M. McMahon
(74) *Attorney, Agent, or Firm* — Henry M. Feiereisen LLC

(57) ABSTRACT

An internal combustion engine has a multi-joint crank drive which includes a plurality of coupling members rotatably mounted on a crankshaft and a plurality of articulated connecting rods rotatably mounted on an eccentric shaft, wherein each of the coupling members is pivotably connected to a piston connecting rod of a piston of the internal combustion engine and to one of the articulated connecting rods. In order that the second-order mass forces can be better compensated without a considerable increase in the friction losses, the required packaging space, the weight of the multi-joint crank drive, or the bearing forces in the bearings of the crankshaft, the articulated connecting rods are provided with additional masses and have a center of mass that lies outside the longitudinal center planes of the articulated connecting rods.

7 Claims, 5 Drawing Sheets

(56) References Cited

U.S. PATENT DOCUMENTS

| | | |
|---|---|---|
| 6,820,577 B2 | 11/2004 | Yamada |
| 2006/0137629 A1* | 6/2006 | Mizuno et al. ............... 123/48 B |
| 2007/0215132 A1* | 9/2007 | Kobayashi et al. ......... 123/78 E |

FOREIGN PATENT DOCUMENTS

| | | |
|---|---|---|
| EP | 1 126 144 | 8/2001 |
| EP | 1 359 303 | 3/2006 |
| EP | 1 760 289 | 3/2007 |
| EP | 1 760 290 | 3/2007 |
| EP | 1 830 051 | 9/2007 |
| EP | 2 119 889 | 11/2009 |
| EP | 2 119 890 | 11/2009 |
| JP | 2004124775 | 4/2004 |
| WO | WO 2007/057149 | 5/2007 |
| WO | WO 2010/046741 | 4/2010 |

* cited by examiner

INTERNAL COMBUSTION ENGINE WITH MULTI-JOINT CRANK DRIVE AND ADDITIONAL MASSES ON ARTICULATED CONNECTING RODS OF THE MULTI-JOINT CRANK DRIVE FOR DAMPING FREE INERTIA FORCES

CROSS-REFERENCES TO RELATED APPLICATIONS

This application is the U.S. National Stage of International Application No. PCT/EP2011/003489, filed Jul. 13, 2011, which designated the United States and has been published as International Publication No. WO 2012/013298 A2 and which claims the priority of German Patent Application, Serial No. 10 2010 032 441.8, filed Jul. 28, 2010, pursuant to 35 U.S.C. 119(a)-(d).

BACKGROUND OF THE INVENTION

The invention relates to an internal combustion engine with multi-joint crank drive and additional masses on articulated connecting rods of the multi-joint crank drive for damping free inertia force.

Internal combustion engines of this type are known for example from DE-A-102005054761, DE-A-102005054760, EP-A-1126144, JP-A-2004124775 or WO-A-2007057149 and are often referred to as internal combustion engines with variable or changeable compression ratio, because the compression ratio can be changed by rotating the eccentric shaft.

In these internal combustion engines the multi-joint crank drive includes beside the eccentric shaft a number of coupling members which corresponds to the number of the cylinders, which coupling members are each rotatably supported on crank pins of the crankshaft and have two arms which protrude over the crankshaft toward opposite sides and are provided at their end with a pivot joint. One of the pivot joints serves for pivotally connecting a piston rod which connects a piston of the internal combustion engine with the crankshaft via the coupling member, while the other pivot joint serves for pivotally connecting a so called articulated connecting rod which is rotatably supported with its other end on a crank pin of the eccentric shaft.

Internal combustion engines of the above mentioned type are further known for example from EP-B-1359303, EP-A-1760290, EP-A-1760289 and U.S. Pat. No. 4,517,931. In these internal combustion engines which are often referred to as internal combustion engines with extended expansion, the eccentric shaft is driven with half the rotational speed of the crankshaft.

In all of these internal combustion engines free first and second-order inertia forces are caused by oscillating masses which inertia forces change with the crank angle. While the first order inertia forces are compensated by compensating weights on the crankshaft and the crank sequence of the crankshaft can be compensated, the free second-order inertia forces cannot be fully compensated in known internal combustion engines in spite of a broad spectrum of different measures. For this reason, internal combustion engines of the above mentioned type are inferior with regard to the running smoothness and running characteristics to conventional internal combustion engines without multi-joint crank drive in which the compensation of second inertia forces occurs often by means of two counter rotating compensation shafts which are driven with double the rotational speed as the crankshaft. However, these measures cannot readily be applied to internal combustion engines with multi-joint crank drive because in this case, on one hand the generated inertia forces do not have a purely oscillating but rather rotating course, and on the other hand, the friction losses of the multi-joint crank drive are already higher than the friction losses of conventional internal combustion engines and would be increased to an unacceptable degree by the additional friction losses of two compensating shafts.

In order to avoid this, the applicant has already proposed in the still unpublished German Patent application 10 2010 004 589 to provide only a single compensation shaft in internal combustion engines of the above mentioned type for damping second-order inertia forces with which these inertia forces can be almost completely compensated.

Taking the above into account, the invention is based on the object to improve an internal combustion engine of the above mentioned type in that the second-order inertia forces can be compensated even better without significant increase of the friction losses, the required construction space, the weight of the multi-joint crank drive or the support forces in the bearings of the crankshaft.

SUMMARY OF THE INVENTION

This object is solved according to the invention in that the articulated connecting rods are provided with additional masses and have a center of mass which lies outside their longitudinal center planes. Longitudinal center planes of the articulated connecting rods refers to the planes which are defined by two connecting-rod eyes of the articulated connecting rods.

On one hand, the invention is based on the recognition that in internal combustion engines of the afore mentioned type, beside the classical oscillating masses such as the pistons, the piston rods and the coupling members, the articulated connecting rods which are moving back and forth also have a significant influence on the second-order inertia forces. Further, the invention is based on the recognition that the free second-order inertia forces can be partially or entirely eliminated when the vector sum of the force vectors of the inertia forces of all oscillating masses is brought to zero or is moved close to zero.

By changing the moved masses of the articulated connecting rods at selected sites of the articulated connecting rods, the positions of the centers of mass of the articulated connecting rods and with this the force vectors of the second-order inertia forces of the articulated connecting rods, can be influenced to make the vector sum of the force vectors of the inertia forces of all oscillating masses zero or move them closer to zero, without causing other disadvantageous effects such as for example a strong increase of the bearing forces in the crankshaft bearings.

Simulations have shown that in internal combustion engines of the aforementioned type, the mass compensation of the second-order inertia forces can be significantly improved with the solution according to the invention with a relatively small increase in construction space and weight.

The solution according to the invention is suited for internal combustion engines with multi-joint crank drive and variable compression as well as for internal combustion engines with multi-joint crank drive and extended expansion.

In a preferred embodiment of the invention, the additional masses and/or the centers of mass of the articulated connecting rods are each located on the side of the longitudinal center planes of the articulated connecting rods which faces away from the crankshaft, wherein the additional masses preferably protrude over the articulated connecting rods which faces away from the crankshaft in the region of a great connecting-rod eye asymmetrically to the longitudinal center planes.

In order for the dimensions of the additional masses to be the same in each pivot position of the articulated connecting rods, the additional masses advantageously have a circular-arc-shaped border on their side which faces away from the articulated connecting rod, which border is generally coaxial to a longitudinal center axis of the great connecting-rod eye and has expediently a radius R between 40 and 80 mm.

In order to be able to minimize the construction space required for the additional masses as far as possible, the at least portions of the additional masses can advantageously be made from a material with a higher specific weight than the ones of the articulated connecting rods themselves.

The solution according to the invention cannot only be used for one piece articulated connecting rods but also for two piece articulated connecting rods in which the additional masses are expediently arranged in the region of the great connecting rod eye on a connecting rod foot of the articulated connecting rods.

The additional masses are expediently molded two-piece, however they can alternatively also be bolted to the articulated connecting rods.

BRIEF DESCRIPTION OF THE DRAWING

In the following, the invention is explained in more detail by way of an exemplary embodiment shown in the drawing. It is shown in FIG. 1 a perspective view of parts of an internal combustion engine with variable compression ratio and a multi-joint-crank drive.

DETAILED DESCRIPTION OF PREFERRED EMBODIMENTS

Figure 1:
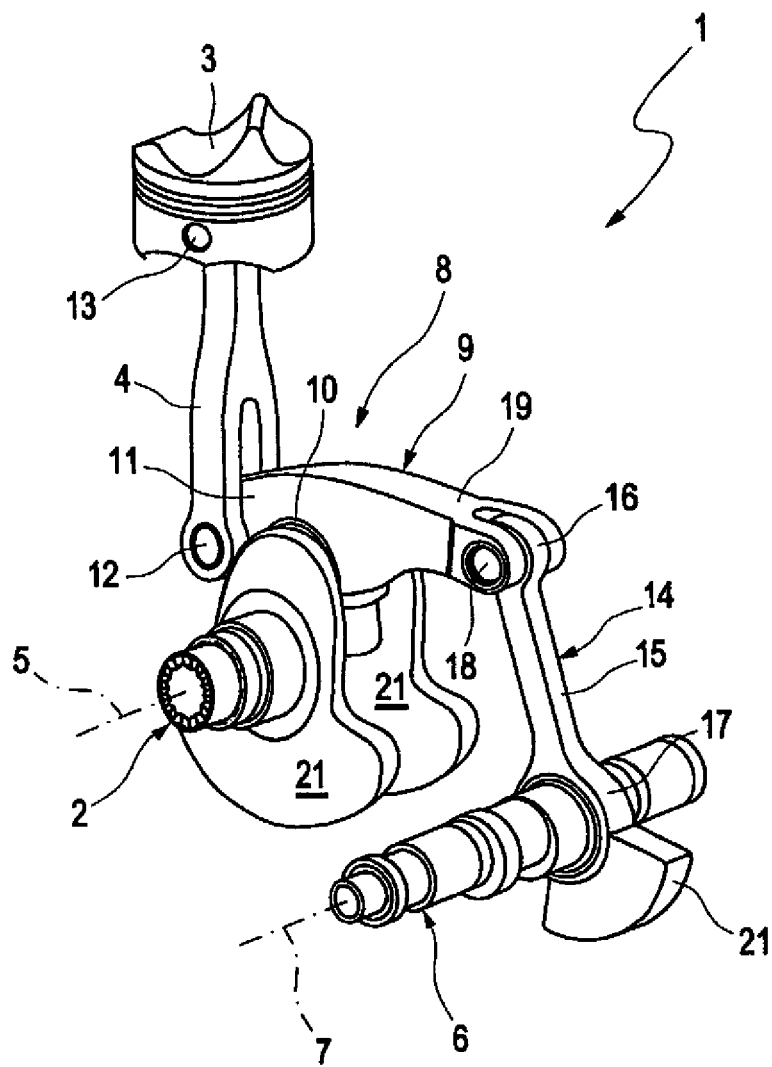
Figure 2:
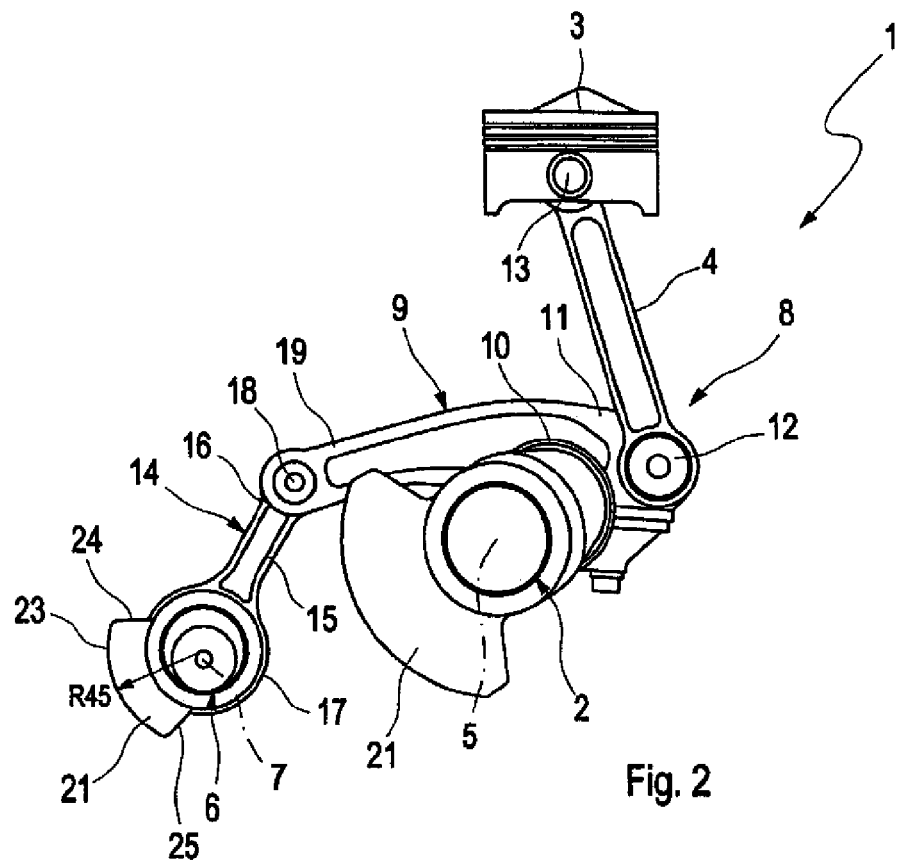
FIG. 2 a front side view of the parts shown in FIG. 1.

As best shown in the FIGS. 1 and 2 as well as 4 and 5, the four tact-4-cylinder internal combustion engines 1 which are only partially shown in the drawing, include a crankshaft 2 and four pistons 3 arranged in series, of which only one is respectively shown in the drawing. The pistons 3 are movable up and down in a cylinder (not shown) of the internal combustion engine 1 and are connected with the crankshaft 2 by a connecting rod 4. The crankshaft 2 is supported in a cylinder crank case (not shown) of the internal combustion engine 1 for rotation about a rotation axis 5.

The internal combustion engines 1 further include an eccentric shaft 6, which has a rotation axis 7 which is parallel to the rotation axis 5 of the crankshaft 2, is rotatably supported adjacent the crankshaft 2 and slightly below the crankshaft 2 in the cylinder crank case and is coupled with the crankshaft 2 via a multi-joint crank drive 8.

Beside the crankshaft 2 and the eccentric shaft 6, the multi-joint crank drive 8 includes overall four coupling members 9 (only one is shown) which are each rotatably supported on a crank pin 10 of the crankshaft 2. Each coupling member 9 has a shorter lift arm 11 which is pivotally connected with the lower end of one of the connecting rods 4 via a pivot joint 12, the end of which connecting rod 4 is articulated on the associated piston via a further pivot joint 13.

The multi-joint crank drive 8 includes further articulated connecting rods 14 which whose number corresponds to the number of piston connecting rods 4 and the coupling members 9, which articulated connecting rods 14 are oriented substantially parallel to the piston connecting rods 4 and arranged in axial direction of the crankshaft 2 and the eccentric shaft 6 in approximately the same plane as the associated piston connecting rod 4, however on the opposite side of the cranks shaft 2.

Figure 3:
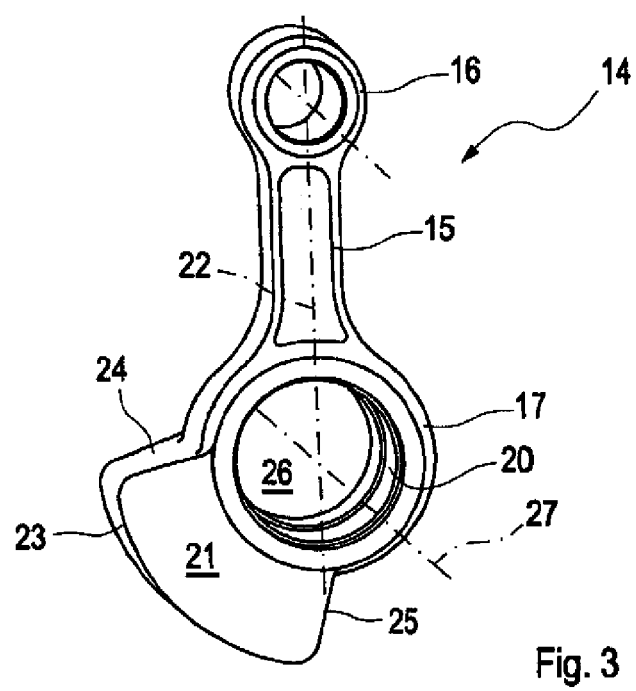
FIG. 3 a perspective view of an articulated connecting rod of the multi-joint crank drive.

As best shown in FIG. 3, each articulated connecting rod 14 includes a connecting rod 15 and two connecting rod eyes 16, 17 which are arranged at opposing ends of the connecting rod 15, which eyes have different inner diameters. The large connecting-rod eye 17 of each articulated connecting rod 14 on the lower end of the connecting rod 15 serves for receiving a crank pin of the eccentric shaft 6, which crank pin is eccentric in relation to the rotation axis 7, on which crank pin the articulated connecting rod 14 is rotatably supported by means of a sliding bearing bushing 20. The smaller connecting-rod eye 16 on the upper end of the connecting rod 15 of each articulated connecting rod 14 serves for receiving a pivot bolt 18 of a pivot joint between the articulated connecting rod 14 and a longer coupling arm 19 of the neighboring coupling member 9, which protrudes over the crankshaft 2 on the side of the crankshaft 2 which is opposite to the lift arm 11.

In the internal combustion engine 1 with variable compression ratio shown in FIGS. 1 and 2, the eccentric shaft 6 can be rotated about its rotation axis 7, in order to change the compression ratio of the internal combustion engine 1.

Figure 4:
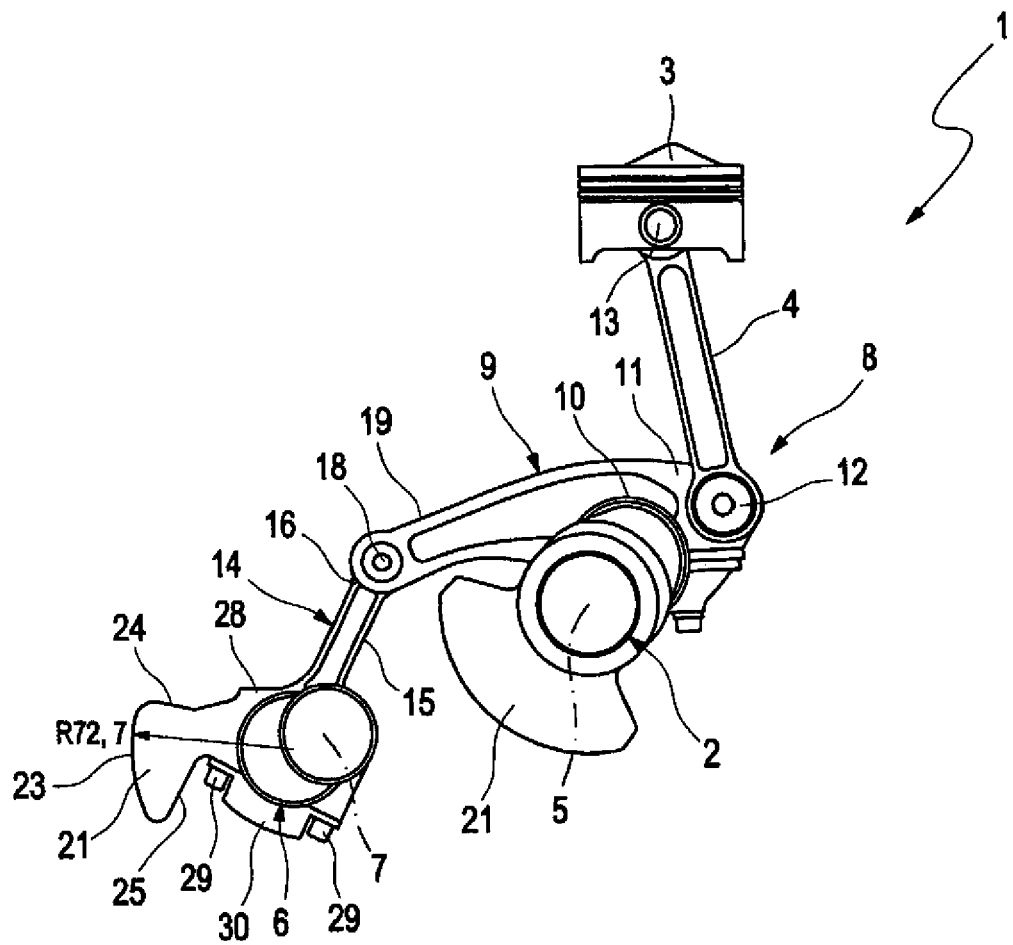
FIG. 4 a front side view of parts of an internal combustion engine with extended expansion and a multi-joint crank drive.
Figure 5:
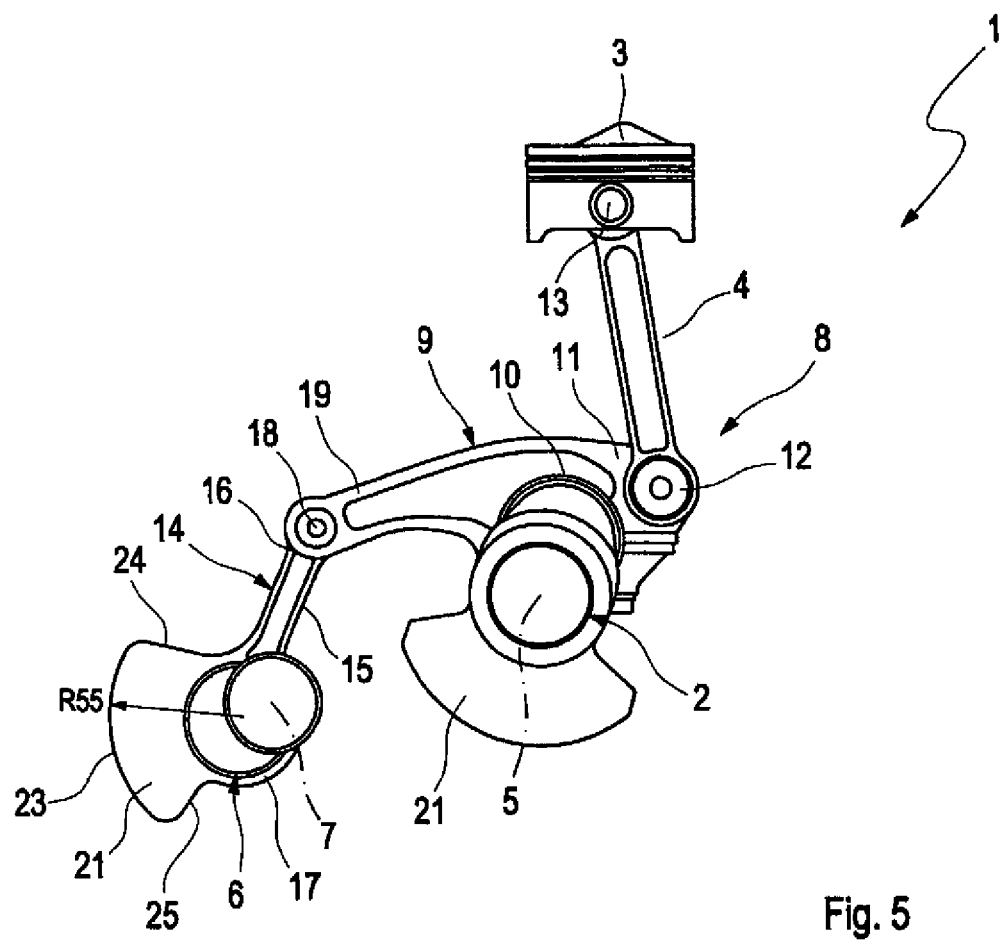
FIG. 5 a front side view of parts of another internal combustion engine with extended expansion and a multi-joint crank drive.

In the internal combustion engines 1 with extended expansion shown in FIGS. 4 and 5 on the other hand, the eccentric shaft 6 is driven with halve the rotational speed of the crankshaft 2.

The oscillating masses of the pistons 3, the piston connecting rods 4, the coupling members 9 and the articulated connecting rods 14, cause free inertia forces which should be compensated as much as possible to improve the smooth running and the acoustic of the internal combustion engine 1. These free inertia forces include predominantly first order inertia forces $F\_1.0$, second-order inertia forces $F\_2.0$ as well as further order inertia forces, of which the comparatively great second-order inertia forces $F\_2.0$ and the comparatively small fourth-order inertia forces $F\_4.0$ are shown as bar diagrams in FIG. 6.

Figure 6:
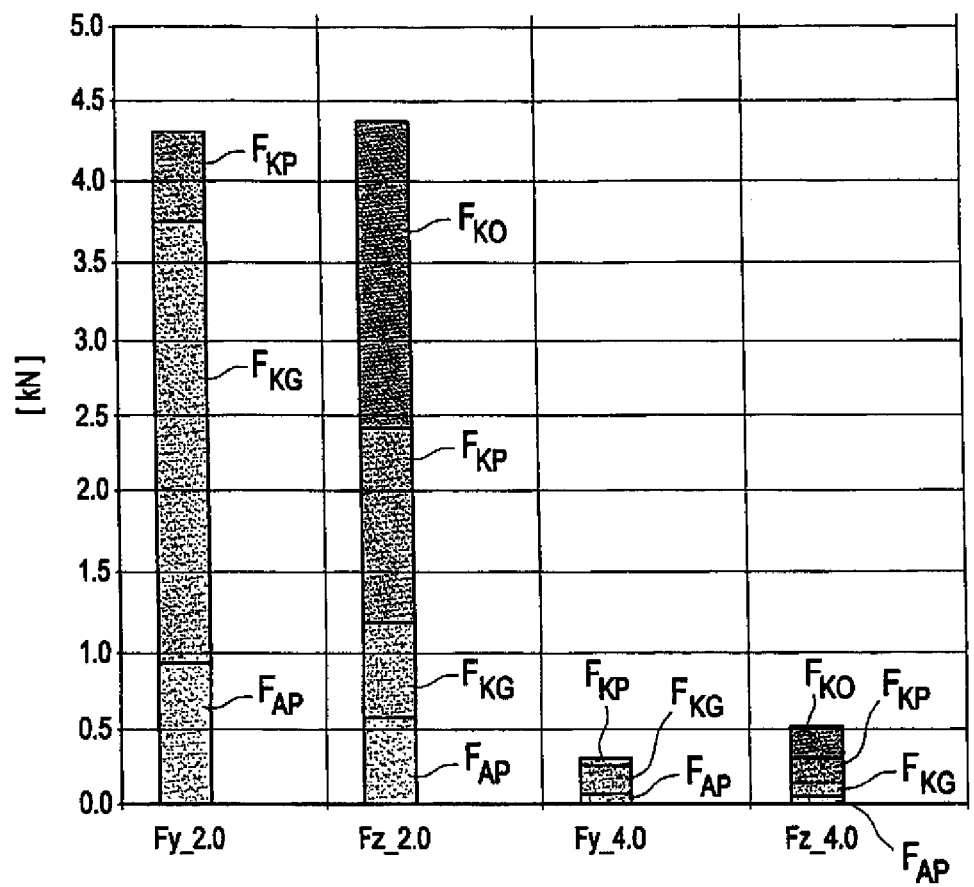
FIG. 6 a bar diagram with different bar pairs which show second-order and fourth order free inertia forces in the direction of a vertical and a transverse axis of the internal combustion engine.

As shown in FIG. 6, the fourth-order inertia forces $F\_4.0$ and second-order inertia forces $F\_2.0$ can be divided into a force component $Fy\_2.0$ or and $Fy\_4.0$ which is oriented parallel to the Y-or transverse axis of the internal combustion engine 1, and a force component $Fz\_2.0$ or $Fz\_4.0$ which is oriented parallel to the Z-or vertical axis of the internal combustion engine 1 (cylinder axle direction).

As also shown in FIG. 6, the force components $Fy\_2.0$ and $Fy\_4.0$ oriented parallel to the Y-or transverse axis of the internal combustion engine 1, are each composed of a mass force component $F_{KP}$ of the oscillating masses of the piston connecting rods 4, a mass force component $F_{KG}$ of the coupling members 9 and a mass force component $F_{AP}$ of the oscillating masses of the articulated connecting rods 14, while the force components Fz_2.0 and Fz_4.0 oriented parallel to the Z-or vertical axis of the internal combustion engine 1, i.e. in cylinder axle direction, are each composed of a mass force component $F_{KO}$ of the oscillating masses of the pistons 3, a mass force component $F_{KP}$ of the oscillating masses of the piston connecting rods 4, a mass force component $F_{KG}$ of the oscillating masses of the coupling members 9 and a mass force component $F_{AP}$ of the oscillating masses of the articulated connecting rods 14.

Figure 7:
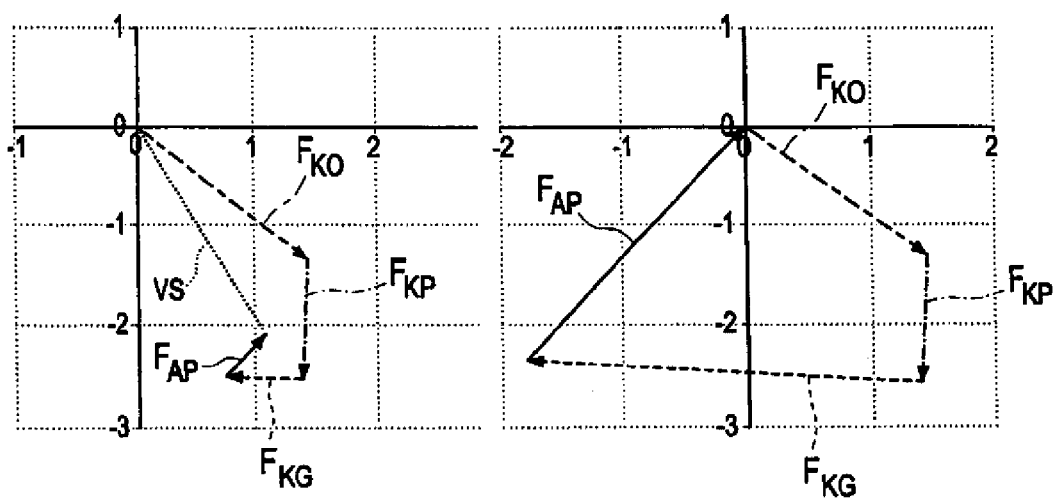
FIG. 7 two vector representations of the free second-order inertia forces in the direction of a vertical axis of the internal combustion engine.

FIG. 7 shows the mass force proportions $F_{KO}$, $F_{KP}$, $F_{KG}$, and $F_{AP}$ of the parallel to the Z-or vertical axis of the internal combustion engine 1 oriented force component F_2.0 not only as in FIG. 6 with its value, but in addition also with its respective phase position as force vectors, whose lengths corresponds to the respective value of the mass force proportion, while the orientation indicates the phase position. The vector sum VS corresponds to the free second-order inertia forces in a direction parallel to the Z-or vertical axis of the internal combustion engine 1 and in the left image in FIG. 7 has a significant value so that significant free second-order inertia forces act in this direction. As can be seen in the right image of FIG. 7, the scaling of individual mass force proportions $F_{KO}$, $F_{KP}$, $F_{KG}$ and $F_{AP}$, i.e., an increase or decrease of the masses of individual components 4, 6, 9, 14, allows decreasing the vector sum VS in this direction to zero, which in the right image of the exemplary embodiment in FIG. 7 occurs by an increase of the masses of the coupling members 9 and the articulated connecting rods 14. This allows completely damping the second-order inertia forces oriented parallel to the Z-or vertical axis of the internal combustion engine 1 and thereby improving the smooth running of the internal combustion engine. As an alternative, the free second-order inertia forces oriented parallel to the Y-or transverse axis of the internal combustion engine can be damped in a corresponding manner or the geometric sum of the free inertia forces in the direction of the Y-or transverse axis and the Z-or vertical axis of the internal combustion engine 1 can be decreased.

The increase of the mass of the articulated connecting rod 14 for increasing the force vector of the mass force proportions $F_{AP}$ of the free second-order inertia forces in a direction parallel to the Z-or vertical axis of the internal combustion engine 1, as shown in the right image of FIG. 7, occurs by an additional mass arranged on each articulated connecting rod 14, which mass is molded in such a manner to the articulated connecting rod 14 in the region of the greater connecting-rod eye 17 and asymmetrical to a longitudinal center plane 22 defined by the center axes of the two connecting-rod eyes 16, 17, that the center of mass of the articulated connecting rod 14 is displaced by the additional mass 21 out of the longitudinal center plane 22.

As best shown in FIGS. 1, 2, 4 and 5, the additional masses 21 are each molded in one piece on the outside of the connecting-rod eyes 17 on the side of the greater connecting-rod eyes of the articulated connecting rods 14 which faces away from the crankshaft 2. As best shown in FIG. 3, the additional masses 21 have the shape of a sector of a circular ring, which extends around a portion of the greater connecting-rod eye 17 and on its side which faces away from the connecting-rod eye 17 has a circular arc-shaped border 23 which is coaxial to a longitudinal center axis of the great connecting-rod eye 17. In circumferential direction of the connecting-rod eye 17, the additional masses 21 have two plane borders 24, 25 which are oriented approximately tangential to a cylindrical opening which is surrounded by the connecting-rod eye 17 and extend over a circumferential angle of 60 to 80 degrees.

As shown in FIGS. 2, 4 and 5, the radius R of the circular-arc-shaped border 23 can vary depending on the configuration of the internal combustion engine 1, wherein the radius in the internal combustion engine 1 with variable compression ratio shown in FIGS. 1 and 2 with 45 mm is the smallest and in the internal combustion engines 1 with extended expansion lift shown in FIGS. 4 and 5 is 72.7 mm or 55 mm.

When producing the additional masses 21 from a material with a higher specific weight compared to material of the articulated connecting rods 14, such as for example a heavy metal, the dimensions of the additional masses 21 can still be decreased.

While the articulated connecting rods 14 shown in FIGS. 1 to 3 and 5 are configured one-piece, the articulated connecting rod 14 in FIG. 4 is configured two-piece, wherein it has a separated bearing eye 17 with a connecting-rod foot 28 and a connecting-rod cover 30 which is fastened on the connecting-rod foot 28 with bolts 29. In this case, the additional mass 21 is molded on the connecting rod foot 28, wherein it protrudes somewhat in the direction of the connecting rod over 30.

The invention claimed is:

1. An internal combustion engine comprising:
a multi-joint crank drive, said multi-joint crank drive comprising:
a plurality of articulated connecting rods rotatably supported on an eccentric shaft, said articulated connecting rods being provided with additional masses and having a center of mass which lies outside respective longitudinal center planes of the articulated connecting rods; and
a plurality of coupling members rotatably supported on a crankshaft, wherein each of the coupling members is pivotally connected with a connecting rod of a piston of the internal combustion engine and with one of the articulated connecting rods wherein the articulated connecting rods are configured two-piece each having a divided connecting rod eye with a connecting-rod foot and a connecting-rod cover fixed on the connecting-rod foot with screws, and wherein the additional masses are respectively molded on the connecting-rod foot so as to protrude in a direction of the connecting-rod cover.

2. The internal combustion engine of claim 1, wherein the additional masses and/or the center of mass of the articulated connecting rods lie on a side of the longitudinal center planes which faces away from the crankshaft.

3. The internal combustion engine of claim 1, wherein the additional masses protrude asymmetrically over the articulated connecting rods in relation to the longitudinal center planes of the articulated connecting rods.

4. The internal combustion engine of claim 3, wherein the additional masses protrude over the articulated connecting rods in a region of a greater one of connecting-rod eyes of the articulated connecting rod.

5. The internal combustion engine of claim 1, wherein the additional masses have an arc-shaped border on a side of the additional masses which faces away from the articulated connecting rods.

6. The internal combustion engine of claim 5, wherein the arc-shaped border is coaxial to a longitudinal center axis of the greater connecting-rod eye and has a radius R between 40 and 80 mm.

7. The internal combustion engine of claim 1, wherein at least a portion of the additional masses is made of a material with a higher specific weight than a material of which the articulated connecting rods are made.

* * * * *